(12) United States Patent
Tiwari et al.

(10) Patent No.: US 8,152,671 B2
(45) Date of Patent: Apr. 10, 2012

(54) SINGLE CLUTCH, TWO PLANETARY HYBRID ARCHITECTURE

(75) Inventors: Awadesh Tiwari, Bangalore (IN); Ravikanth GV, Karnataka (IN); Sriram Ravichandran, Karnataka (IN); Kumpatla VVP Naidu, Karnataka (IN)

(73) Assignee: GM Global Technology Operations LLC, Detroit, MI (US)

( * ) Notice: Subject to any disclaimer, the term of this patent is extended or adjusted under 35 U.S.C. 154(b) by 27 days.

(21) Appl. No.: 12/828,528

(22) Filed: Jul. 1, 2010

(65) Prior Publication Data

US 2012/0004061 A1 Jan. 5, 2012

(51) Int. Cl.
*F16H 3/72* (2006.01)
*F16H 37/06* (2006.01)
*B60K 1/00* (2006.01)
(52) U.S. Cl. .......................... 475/5; 180/65.7
(58) Field of Classification Search .................. 475/3, 4, 475/5, 6; 180/65.21, 65.23, 65.24, 65.26, 180/65.6, 65.7
See application file for complete search history.

(56) References Cited

U.S. PATENT DOCUMENTS

| | | | | |
|---|---|---|---|---|
| 7,232,393 B2 * | 6/2007 | Bucknor et al. | ................... | 475/5 |
| 7,252,613 B2 * | 8/2007 | Bucknor et al. | ................... | 475/5 |
| 7,273,435 B2 * | 9/2007 | Raghavan et al. | ............ | 475/151 |
| 7,300,374 B2 * | 11/2007 | Bucknor et al. | ................... | 475/5 |
| 7,367,911 B2 * | 5/2008 | Raghavan et al. | ......... | 180/65.25 |
| 7,727,100 B2 * | 6/2010 | Bucknor et al. | ................... | 475/5 |
| 7,972,237 B2 * | 7/2011 | Ota | ................................ | 475/5 |
| 2010/0137091 A1 * | 6/2010 | Park et al. | ......................... | 475/5 |
| 2010/0273594 A1 * | 10/2010 | Sung | ................................... | 475/5 |
| 2010/0279817 A1 * | 11/2010 | Holmes | ............................ | 477/4 |
| 2011/0130235 A1 * | 6/2011 | Phillips | ............................ | 475/5 |

\* cited by examiner

*Primary Examiner* — David D Le
*Assistant Examiner* — Michael Gonzalez
(74) *Attorney, Agent, or Firm* — Quinn Law Group, PLLC

(57) ABSTRACT

A hybrid powertrain for a vehicle includes a prime mover, which may be an engine, and a transmission that has an input member configured for connection with the prime mover to receive torque from the prime mover, an output member, and a stationary member. A first motor/generator and a second motor/generator are provided as additional motive sources. A first planetary gear set and a second planetary gear set are included, each having a respective first member, second member, and third member. Only one clutch is operatively connected to the transmission, and it is selectively engageable to ground the input member and the first member of the second planetary gear set to the stationary member.

14 Claims, 1 Drawing Sheet

| MODE | C | ENGINE | M/GA | M/GB |
|---|---|---|---|---|
| EVT1 | O | X | G | M |
| EV1 | X | O | M | M |

SINGLE CLUTCH, TWO PLANETARY HYBRID ARCHITECTURE

TECHNICAL FIELD

The invention relates to a hybrid transmission having two motor/generators, only two planetary gear sets, and a single torque-transmitting mechanism.

BACKGROUND OF THE INVENTION

Automotive hybrid powertrains typically have an engine and one or more motor/generators interconnected by transmission gearing and selectively engagable torque-transmitting mechanisms controlled to provide various vehicle operating modes, such as one or more electrically-variable modes of operation, fixed speed ratio modes, and an electric-only (battery-powered) mode. Hybrid powertrains may improve vehicle fuel economy in a variety of ways, primarily by using one or both of the motor/generators for vehicle braking and using the regenerated energy to power the vehicle electrically, with the engine off. The engine may be turned off at idle, during periods of deceleration and braking, and during periods of low speed or light load operation to eliminate efficiency losses due to engine drag. Braking energy captured via regenerative braking (or electrical energy generated during periods when the engine is operating) is utilized during these engine-off periods. Transient demand for engine torque or power is supplemented by the motor/generators during operation in engine-on modes, allowing for a smaller engine without reducing vehicle performance. Additionally, the electrically-variable modes may allow the engine to be operated at or near the optimal efficiency point for a given power demand.

SUMMARY OF THE INVENTION

Existing hybrid architectures provide good driving range and fuel economy, but require multiple clutches to establish the various operating modes, and hence present packaging issues in smaller vehicles, as well as cost issues associated with the hydraulic system required to operate the clutches. There is a need for hybrid powertrains that offer the fuel economy benefits of various operating modes while containing overall cost by minimizing the number of required components and/or by providing design flexibility for a variety of vehicle platforms by scaling component size or capacity as required for a particular platform.

The powertrain architecture provided has only one clutch, hence reducing or completely eliminating hydraulics and the associated cost and packaging space requirements. Specifically, a hybrid powertrain for a vehicle includes a prime mover, which may be an engine, and a transmission that has an input member configured for connection with the prime mover to receive torque from the prime mover, an output member, and a stationary member. A first motor/generator and a second motor/generator are provided as additional motive sources. A first planetary gear set and a second planetary gear set are included, each having a respective first member, second member, and third member. The input member and the engine are continuously connected for common rotation with the first member of the second planetary gear set. The second motor/generator is connected for rotation with the second member of the second planetary gear set. The first motor/generator is connected for common rotation with the first member of the first planetary gear set. The second member of the first planetary gear set is continuously grounded to the stationary member. The third member of the first planetary gear set and the third member of the second planetary gear set are connected for common rotation with the output member. Only one clutch is operatively connected to the transmission, and it is selectively engagable to ground the input member and the first member of the second planetary gear set to the stationary member.

In at least one embodiment, the clutch is an electromagnetic clutch, and thus does not require any pressurized hydraulic fluid for engagement. In comparison with a hydraulic clutch, an electromagnetic clutch facilitates packaging, and may reduce weight, cost, and clutch response time. The member that the engine is connected to may be a sun gear member, thus allowing torque multiplication through the planetary gear sets so that the engine may operate closer to its most efficient operating speed. Because both motor/generators are operatively connected with the transmission output member, if one motor/generator fails, the other can still be operated as a motor or a generator to allow hybrid operating modes.

The powertrain is sufficiently compact such it can be easily embedded in existing manual transmissions and automatic transmissions. In a manual transmission, the clutch could be driver operated. The powertrain can realize improved or comparable fuel economy to that of existing two motor architectures.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figures 1, 2:
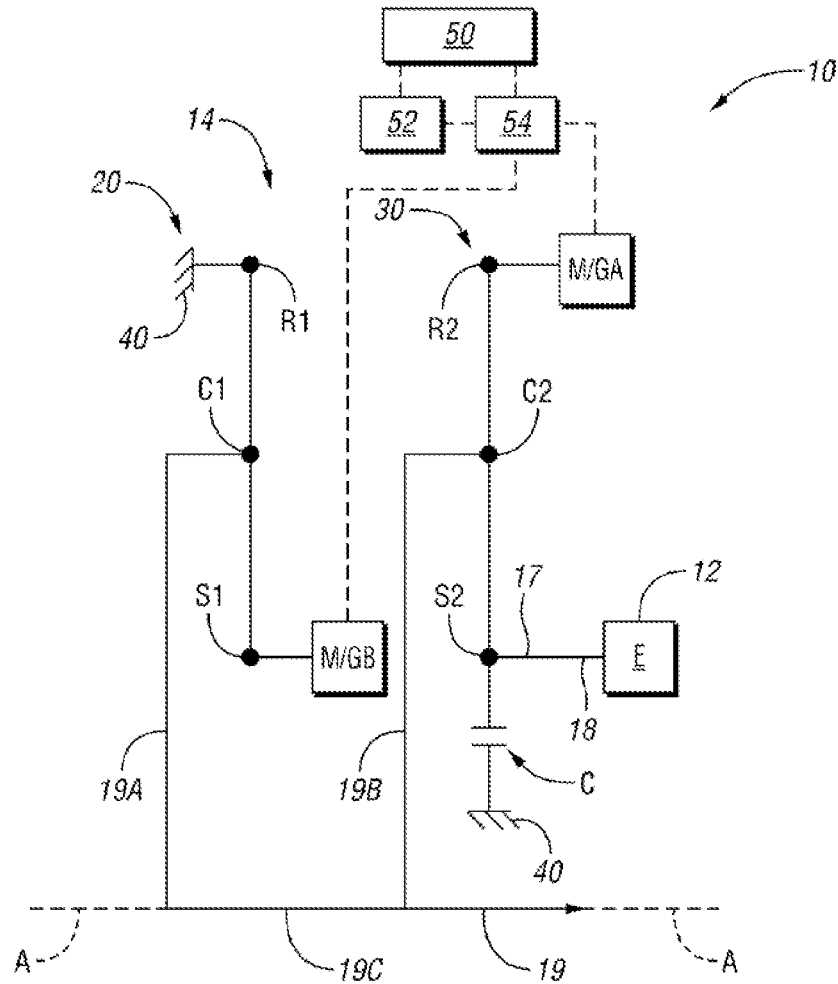
FIG. 1 is a schematic illustration of a powertrain.
FIG. 2 is a clutching table showing some of the operating modes of the powertrain of FIG. 1.

Referring to the drawings, FIG. 1 shows a hybrid powertrain 10 that includes a prime mover, such as an internal combustion engine 12 (labeled E), connected with a hybrid transmission 14. Other types of prime movers, such as fuel cells, pneumatic engines, etc. may be used in place of an internal combustion engine. The hybrid transmission 14 includes two additional motive sources, a first motor/generator M/GB and a second motor generator M/GA. The engine E and motor/generators M/GA and M/GB are interconnected via two planetary gear sets 20 and 30 to provide various operating modes.

A first planetary gear set 20 includes a sun gear member 51, a ring gear member R1, and a carrier member C1 that rotatably supports a set of pinions that mesh with both the sun gear member S1 and the ring gear member R1. The sun gear member S1 is referred to as the first member of the planetary gear set 20. The ring gear member R1 is referred to as the second member of the planetary gear set 20. The carrier member C1 is referred to as the third member of the planetary gear set 20. A person of ordinary skill in the art will understand the structure of such a simple planetary gear set 20, which is shown only schematically in FIG. 1. In one exemplary embodiment, the tooth ratio of the ring gear member R1 to the sun gear member S1 is 2.692.

A second planetary gear set 30 includes a sun gear member S2, a ring gear member R2, and a carrier member C2 that rotatably supports a set of pinions that mesh with both the sun gear member S2 and the ring gear member R2. The sun gear member S2 is referred to as the first member of the planetary gear set 30. The ring gear member R2 is referred to as the second member of the planetary gear set 30. The carrier member C2 is referred to as the third member of the planetary gear set 30. In one exemplary embodiment, the tooth ratio of the ring gear member R2 to the sun gear member S2 is 1.954.

The transmission 14 has an input member 17 continuously connected for common rotation with the sun gear member S2, and with an output member 18 of the engine E. Thus, the engine output member 18 is continuously connected for common rotation with the sun gear member S2. Connecting the engine E to a sun gear member allows torque multiplication and speed reduction through planetary gear set 30, thus permitting the engine E to operate at its most efficient point for a greater period than if the engine E were connected to a ring gear member.

The transmission 14 also has an output member 19 that is connected through a final drive mechanism (not shown) to vehicle wheels (also not shown) to provide tractive power to the wheels to propel the vehicle. The output member 19 is continuously connected for common rotation with both of the carrier members C1 and C2 via respective hub portions 19A, 19B branching from a shaft portion 19C. The shaft portion 19C of the output member 19 is coaxial with the axis of rotation A of the planetary gear sets 20, 30 and is radially surrounded by the planetary gear sets 20, 30. In one embodiment, such an arrangement of the transmission 14 is used in a front-wheel drive vehicle. Only a portion of the transmission 14 above the axis of rotation A is shown in FIG. 1. Another portion of the transmission 14 is situated below the axis of rotation A and is substantially symmetrical with the portion shown above the axis of rotation.

A rotor of the first motor/generator M/GB is connected for common rotation with the sun gear member S1. A rotor of the second motor/generator M/GA is connected for common rotation with the ring gear member R2. The ring gear member R1 is continuously grounded to a stationary member 40, such as a transmission casing, so that the ring gear member R1 does not rotate.

A clutch C is selectively engagable to ground the sun gear member S2, and thus also ground the input member 17 and the engine output member 18 to the stationary member 40. The clutch C may be an electromagnetic clutch that is controlled electronically by a controller 52, discussed below. Alternatively, the clutch C could be controlled manually in a manual transmission. If the clutch C is an electromagnetic clutch or a manually-controlled clutch, then no hydraulics are required to operate the transmission 14. If the clutch C is a hydraulic clutch, the hydraulic requirements of the transmission 14 would still be greatly reduced in comparison to most hybrid transmissions, as the transmission 14 has no other torque-transmitting mechanisms. An electromagnetic clutch is a clutch that transmits torque due to a magnetic field created by an electrical voltage applied to the clutch. The magnetic field causes a mechanical connection within the clutch that transmits torque. When the electrical voltage is removed, the mechanical field, and thus the mechanical connection end and the torque transmission through the clutch ceases. The electromagnetic clutch C could be a single face clutch, a multiple disk clutch, an electromagnetic tooth clutch, an electromagnetic particle clutch, a hysteresis-powered clutch, or other types of electromagnetic clutches.

The motor/generators M/GA and M/GB are operatively connected to an energy storage device 50 that may be one or more batteries. Other electric storage devices that have the ability to store electric power and dispense electric power may be used in place of the batteries. A controller 52 operatively connected to the motor/generators M/GA and M/GB monitors the speed of the rotors. The controller 52 also receives information regarding engine speed, either from a separate engine controller, or by connection to the engine E. Based on this and other vehicle operating conditions, such as driver accelerator commands, the controller 52 is operable to provide electrical energy from the energy storage device 50 through a power inverter 54 to either or both motor/generators M/GA and M/GB to cause the motor/generators to function as motors, adding torque to the transmission 14. The power inverter 54 converts direct current to alternating current when electrical power is provided to the motor/generators M/GA and/or M/GB. If the information received by the controller 52 indicates that either motor/generator M/GA or M/GB should be operated as a generator, converting mechanical energy into electrical energy, the controller 52 is operable to cause the power inverter 54 to convert alternating current provided from either motor/generator into direct current stored in the energy storage device 50. The dashed lines between the motor/generators M/GA, M/GB, and the energy storage device 50, controller 52, and inverter 54 represent transfer conductors for relaying electrical current or signals between the components.

Referring to FIG. 2, the engagement status of the clutch C and the operating state of the engine E and motor/generators M/GA and M/GB in two different operating modes for the powertrain 10 are illustrated. The first mode listed is the electrically-variable operating mode EVT1. In the electrically-variable operating mode, the clutch C is not engaged, and the engine E is on and provides torque at the sun gear member S2. Motor/generator M/GA is controlled to either operate as a motor, supplying positive torque to the transmission 14 at the ring gear member R2 to aid the motor/generator M/GB, which also functions as a motor, to propel the vehicle. Alternatively, motor/generator M/GA can be controlled to function as a generator, converting some of the torque provided by the engine E through planetary gear set 30 into electric energy used by the motor/generator M/GB, which is controlled to function as a motor, providing torque at the sun gear member S1. With the ring gear member R1 held stationary, torque is multiplied through the planetary gear set 20 from the sun gear member S1 to the carrier member C1 and output member 19. A portion of the torque provided by the engine E that is not converted to electrical energy by the motor/generator M/GA is multiplied through planetary gear set 30 from the sun gear member S2 to the carrier member C2 and the output member 19. The controller 52 may establish the electrically-variable operating mode EVT1 when the vehicle requires greater torque at the output member 19 than the motor/generators M/GA and M/GB can provide alone, or if the state of charge of the energy storage device 50 requires recharging, such as when the vehicle is operated at a cruising speed for an extended period.

Referring again to FIG. 2, the second mode listed is the electric-only operating mode EV1. In this mode, the clutch C is engaged, grounding the engine E, input member 17 and sun gear member S2 to the stationary member 40. Thus, the engine E is off. Both of the motor/generators M/GA and M/GB are controlled to operate as motors, providing torque at sun gear member S1 and ring gear member R2, respectively, which is carried through the planetary gear sets 20, 30 to the output member 19. The controller 52 can control the motor/generators M/GA and M/GB to act as motors until the state of charge of the energy storage device 50 reaches a predetermined minimum level, at which point the clutch C will be released, and the engine E will be started to establish the EVT1 mode, allowing the motor/generator M/GA to act as a generator, converting a portion of the engine torque into electrical energy to replenish the energy storage device 50. The EV1 mode is appropriate for an initial launch of the vehicle, when the engine E is cold.

The configuration of the transmission 14 allows the powertrain 10 to still be operable to provide torque at the output member 19 even if either of the motor/generators M/GA or M/GB fails (i.e., cannot be controlled to function as either a motor or a generator). For example, if motor/generator M/GA fails, the motor/generator M/GB could be operated as a motor with the engine E off to propel the vehicle until the state of charge of the energy storage device 50 reaches a predetermined minimum, or motor/generator M/GB can be off, with the engine E propelling the vehicle alone. If motor/generator M/GB fails, motor/generator M/GA can be controlled to operate as a motor to provide reaction torque in conjunction with the grounded ring gear member R1 while the engine E is on to propel the vehicle.

While the best modes for carrying out the invention have been described in detail, those familiar with the art to which this invention relates will recognize various alternative designs and embodiments for practicing the invention within the scope of the appended claims.

The invention claimed is:

1. A hybrid powertrain for a vehicle comprising:
a prime mover;
a transmission having
an input member configured for connection with the prime mover to receive torque from the prime mover;
an output member;
a stationary member;
a first motor/generator and a second motor/generator;
a first planetary gear set and a second planetary gear set, each having a respective first member, second member, and third member; wherein the input member and the prime mover are continuously connected for common rotation with the first member of the second planetary gear set; wherein the second motor/generator is connected for common rotation with the second member of the second planetary gear set; wherein the first motor/generator is connected for common rotation with the first member of the first planetary gear set; wherein the second member of the first planetary gear set is continuously grounded to the stationary member; wherein the third member of the first planetary gear set and the third member of the second planetary gear set are connected for common rotation with the output member; and
only one clutch; wherein the clutch is selectively engagable to ground the input member and the first member of the second planetary gear set to the stationary member.

2. The hybrid powertrain of claim 1, wherein the first member of the first planetary gear set is a sun gear member, the second member of the first planetary gear set is a ring gear member, and the third member of the first planetary gear set is a carrier member.

3. The hybrid powertrain of claim 1, wherein the first member of the second planetary gear set is a sun gear member, the second member of the second planetary gear set is a ring gear member, and the third member of the second planetary gear set is a carrier member.

4. The hybrid powertrain of claim 1, further comprising:
an electronic controller operatively connected to the motor/generators; wherein the electronic controller is operable to control both motor/generators to function as motors when the clutch is engaged, establishing an electric-only operating mode.

5. The hybrid powertrain of claim 1, further comprising:
an electronic controller operatively connected to the motor/generators; wherein the electronic controller is operable to control the first motor/generator to function as either a motor or a generator and the second motor/generator to function as a motor when the clutch is not engaged and the prime mover provides torque at the second member of the second planetary gear set, establishing an electrically-variable operating mode.

6. The hybrid powertrain of claim 5, wherein the electrically-variable operating mode is established to launch the vehicle from a stationary position.

7. The hybrid powertrain of claim 1, wherein the clutch is an electromagnetic clutch.

8. The hybrid powertrain of claim 1, wherein the planetary gear sets radially surround the output member.

9. A hybrid transmission for a vehicle with an engine comprising:
an input member connected to the engine;
a first and a second planetary gear set each having a respective first member, second member, and third member; wherein the engine is connected for common rotation with the first member of the second planetary gear set;
a first motor/generator connected for common rotation with the first member of the first planetary gear set;
a second motor/generator connected for common rotation with the second member of the second planetary gear set; wherein the second member of the first planetary gear set is grounded to a stationary member;
an output member at which torque is provided to propel the vehicle connected for common rotation with the third members of the first and the second planetary gear sets; and
an electromagnetic clutch operable to selectively ground the engine and the first member of the second planetary gear set to the stationary member.

10. The hybrid transmission of claim 9, further comprising:
an electronic controller operatively connected to the motor/generators; wherein the electronic controller is operable to control both motor/generators to function as motors when the clutch is engaged, establishing an electric-only operating mode; and
wherein the electronic controller is operable to control the first motor/generator to function as either a motor or a generator and the second motor/generator to function as a motor when the clutch is not engaged and the engine provides torque at the second member of the second planetary gear set, establishing an electrically-variable operating mode.

11. The hybrid transmission of claim 10, wherein the controller is configured to control one of the motor/generators to act as a motor to provide torque for propelling the vehicle in the event of failure of the other of the motor/generators.

12. The hybrid transmission of claim 9, wherein the electrically-variable mode is established to launch the vehicle from a stationary position.

13. The hybrid transmission of claim 9, wherein the planetary gear sets radially surround the output member.

14. A hybrid powertrain comprising:
an engine having an engine output member at which engine torque is provided when the engine is on;
two planetary gear sets, one of the planetary gear sets having a member continuously grounded to a stationary member and the other planetary gear set having a member continuously connected for common rotation with the engine output member;

two motor/generators each of which is connected for rotation with a different member of a different respective one of the planetary gear sets;

a transmission output member continuously connected for rotation with still another different respective member of each of the planetary gear sets;

only one torque-transmitting mechanism operatively connected to the powertrain; wherein the torque-transmitting mechanism is selectively engagable to ground the member of the planetary gear set that is continuously connected for common rotation with the engine output member; and wherein the powertrain is configured to provide an electric-only operating mode when the torque-transmitting mechanism is not engaged, and an electrically-variable operating mode when the torque-transmitting mechanism is engaged.

* * * * *